March 23, 1926.
M. MADSEN
1,577,647
PORTABLE PAVING PLANT
Filed July 7, 1924　　5 Sheets-Sheet 1
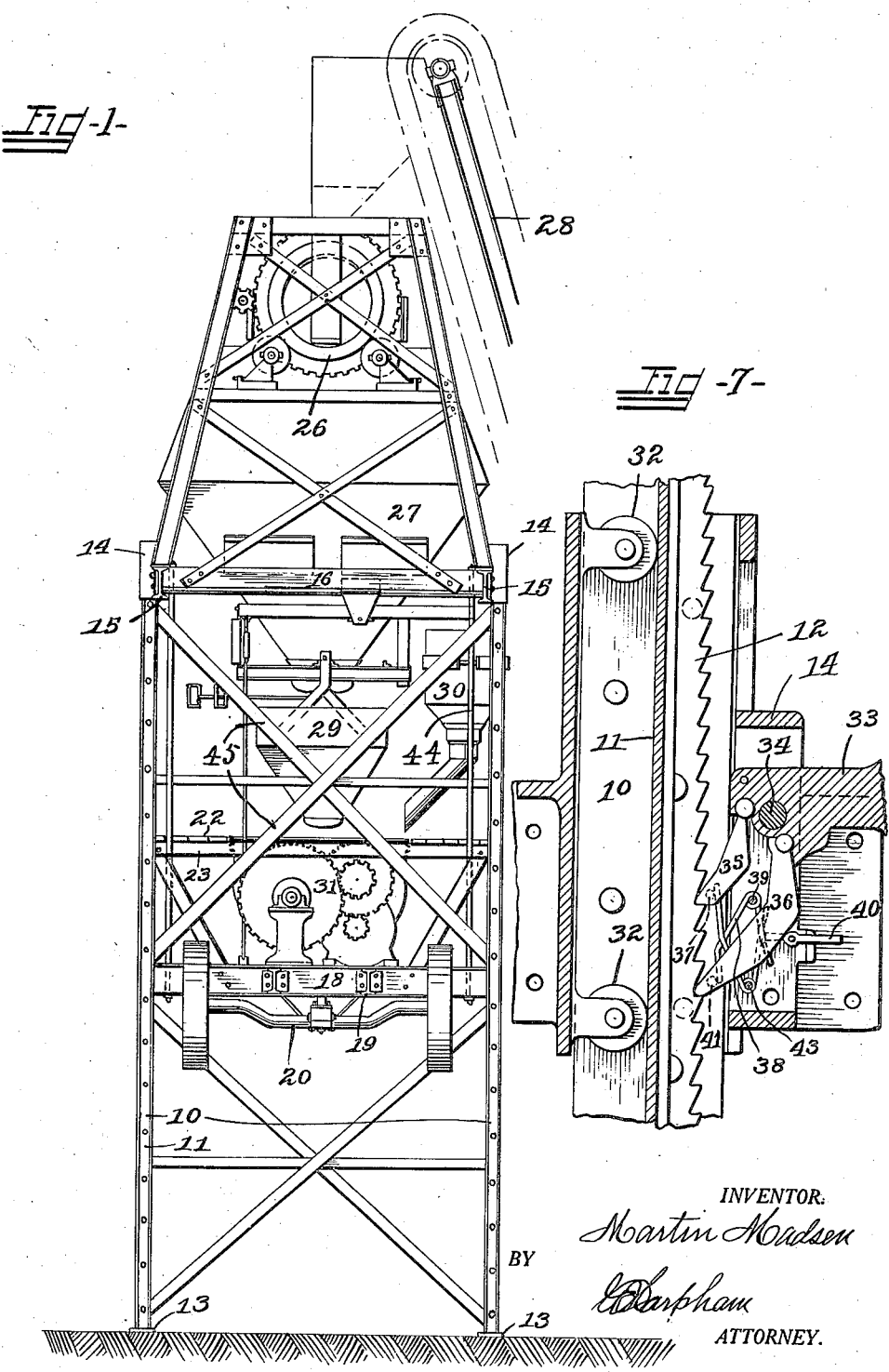
INVENTOR.
Martin Madsen
BY
ATTORNEY.

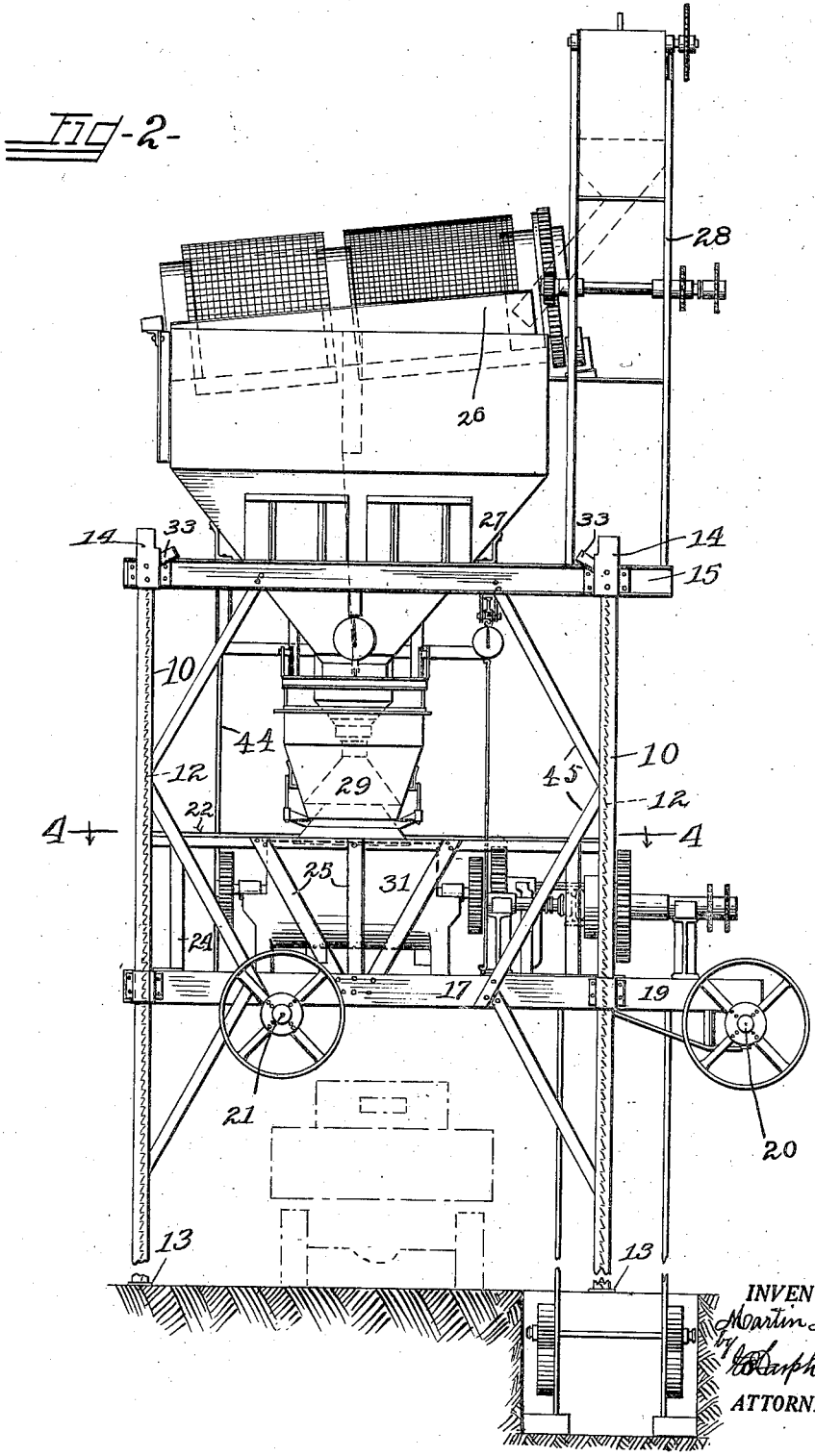

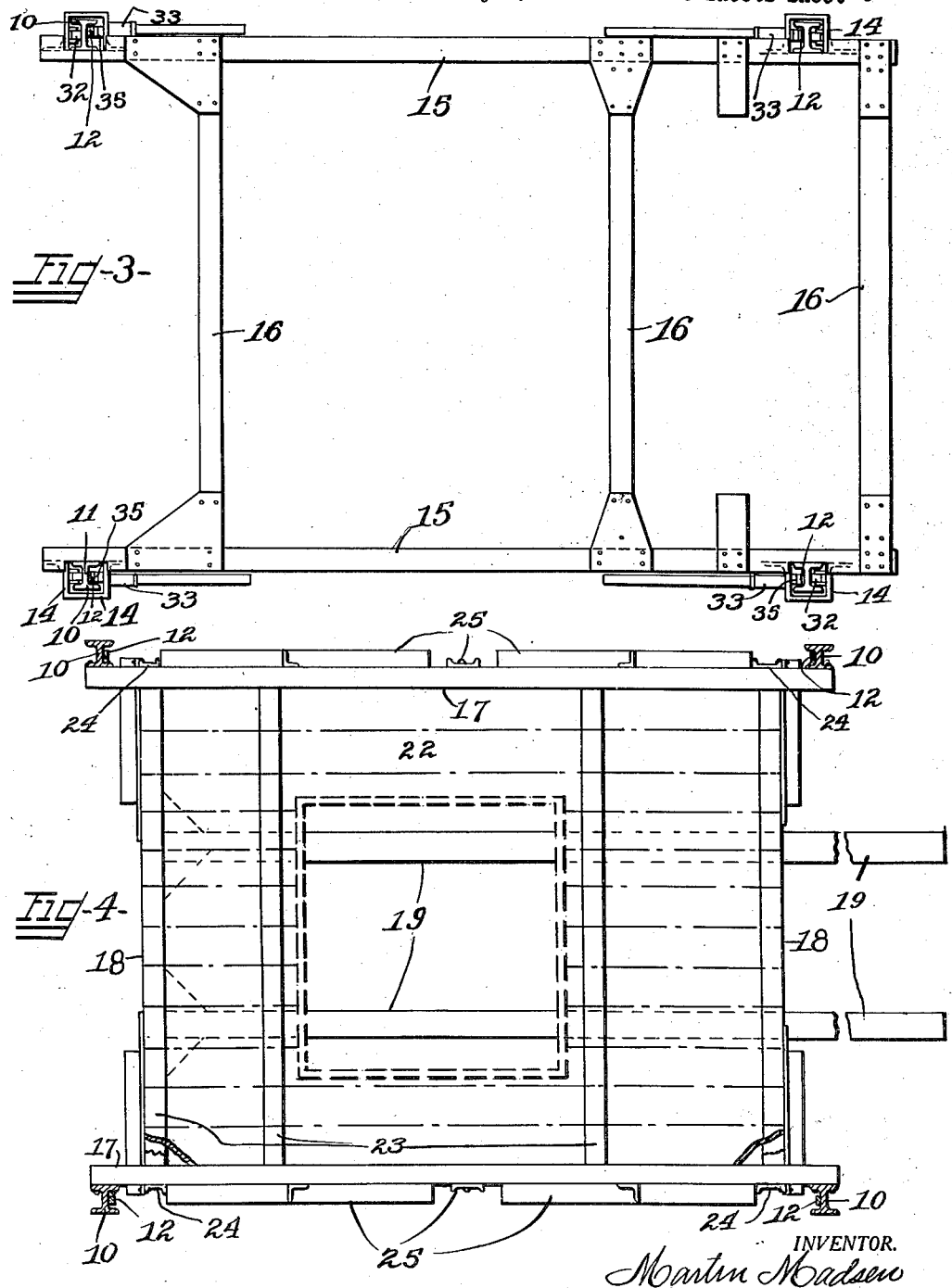

March 23, 1926. 1,577,647
M. MADSEN
PORTABLE PAVING PLANT
Filed July 7, 1924     5 Sheets-Sheet 4
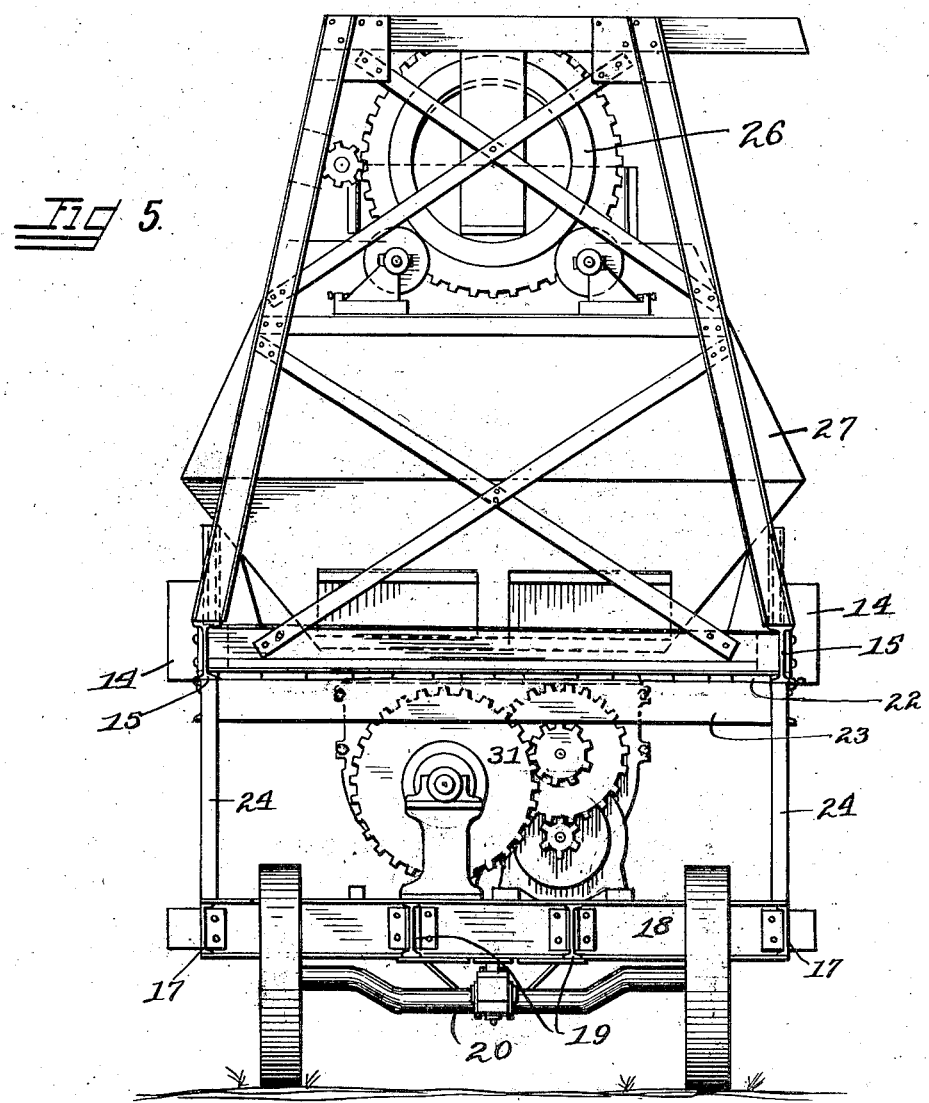
INVENTOR.
Martin Madsen
BY
ATTORNEY.

March 23, 1926.  1,577,647
M. MADSEN
PORTABLE PAVING PLANT
Filed July 7, 1924   5 Sheets-Sheet 5
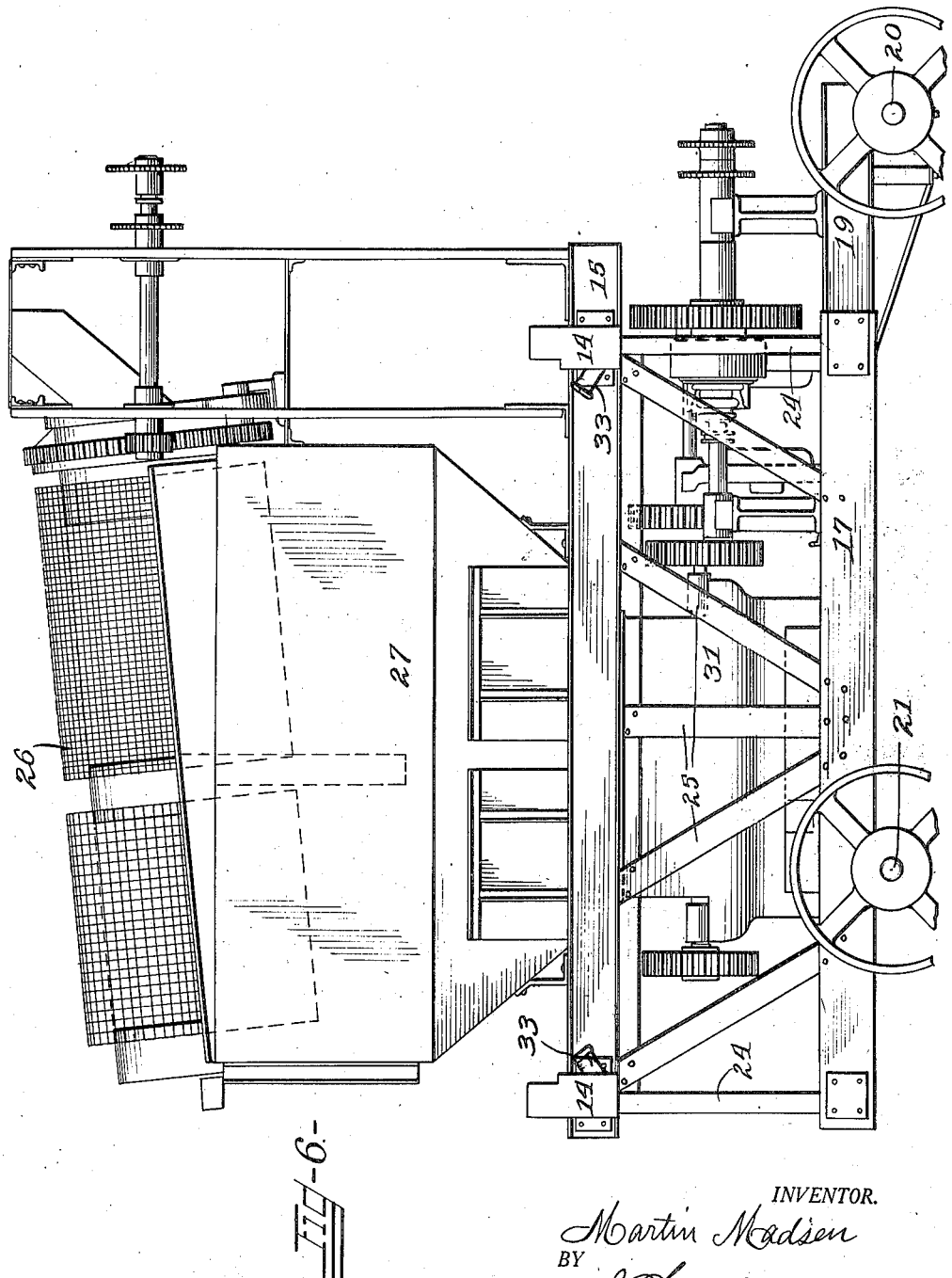
INVENTOR.
Martin Madsen
BY
ATTORNEY.

Patented Mar. 23, 1926.

1,577,647

UNITED STATES PATENT OFFICE.

MARTIN MADSEN, OF MONTEREY PARK, CALIFORNIA.

PORTABLE PAVING PLANT.

Application filed July 7, 1924. Serial No. 724,698.

*To all whom it may concern:*

Be it known that I, MARTIN MADSEN, a citizen of the United States, residing at the city of Monterey Park, in the county of Los Angeles, State of California, have invented new and useful Improvements in Portable Paving Plants, of which the following is a specification.

In the portable paving plants in common use it takes considerable time in assembling and in disassembling the plant when it is necessary to remove the plant from one place to another. It is the object of my present invention to so construct a portable paving plant that it can be disassembled more quickly for transportation and more quickly assembled in a new place than is possible with the plants now in common use. To that end I have embodied in a portable paving plant lifting jacks of separable members that enables me to assemble and disassemble the plant in less time than without their use, one of the members of each jack constituting a corner post when the plant is assembled for use.

In the drawings forming a part of this application:

Figure 1 is an end elevation of my improved plant assembled for use, with a portion of the material elevator shown diagrammatically;

Fig. 2 is a side elevation of the parts shown in Fig. 1;

Fig. 3 is an enlarged plan of the top frame showing the jack construction and its attachment thereto, the other parts being omitted;

Fig. 4 is an enlarged plan on the line 4—4 of Fig. 2 of certain of the parts of the frame, the other parts being omitted;

Fig. 5 is an end view of a portion of the plant shown in Fig. 1, disassembled and ready for transportation;

Fig. 6 is a side view of the parts shown in Fig. 5;

Fig. 7 is an enlarged detail, partly in section, illustrating the jack construction.

In Figs. 1 and 2, the parts are positioned for use. The corner posts 10 form part of the jack construction and are preferably I-beams and have bolted to one side of the web 11 racks 12 (best shown in Fig. 7) which extend from the top to or near the bottom of 10. Posts 10 may be provided on the bottoms thereof with removable foot blocks 13 and at the tops, when positioned for use, they pass into the jack head casings 14 and are bolted to the side members 15 of the top frame. The jack heads 14 are also bolted to the side members of the top frame. Members 15 are connected by the cross members 16. The bottom frame is composed of the side members 17 which when the parts are positioned for use are bolted to posts 10, as best shown in Fig. 4. Members 17 are connected by cross members 18. To members 18 are secured the wheel frame members 19 which at one end preferably project beyond members 18 to provide a suitable mounting for the front truck 20 to enable it to be turned for guiding when the plant is being moved. A rear truck 21 is secured to members 19.

Trucks 20 and 21 are preferably removably mounted so as to be detached when the plant is in use. At a suitable distance above the bottom frame is a platform composed of flooring boards 22 secured to members 23. Corner posts 24 and braces 25 are secured to the lower frame members and to the platform members 23. The platform is at such height above the lower frame that when the upper frame is lowered to and rests thereon and the lower frame is lowered to be supported by the trucks that the parts carried by the upper frame can pass under the usual highway bridges as the plant is moved. On the upper frame is mounted the usual sizing and screening apparatus, indicated by the numeral 26. The usual bins for holding the sorted material are indicated by the numeral 27 and have the lower portion removably connected to the upper portion.

The usual elevating mechanism for carrying the sand, gravel or rock to the sizing apparatus is indicated by the numeral 28 and is detachably connected to the sizing apparatus. Only a part of the upper portion is shown. The weighing apparatus is indicated by the numeral 29 and is detachably secured to the bins to permit its removal when the upper frame is to be lowered to the platform. The asphaltum hopper is detachably connected to the frame to permit its removal when the plant is moved, and is indicated by the numeral 30. Below the weighing apparatus is the usual pug mill which mixes the material into paving material which is dumped into the vehicles which are driven under the mill, which mill is indicated by the numeral 31. The jack heads are all of the same construction and there is one at each of the corners of the upper frame. Each jack head comprises the following elements and is shown in enlarged detail in Fig. 7, to wit: A casing 14 through which post 10 is moved when the frames are to be raised or lowered. Casing 14 has anti-friction rollers 32 secured thereto which bear against web 11 opposite to rack 12. An operating lever 33 is rockably mounted in casing 14 by bolt 34. Swingingly mounted in the inner end of lever 33 is an upper dog 35 and a lower dog 36. In the nose of dog 35 is a pin 37 that is engaged by one end of a spring 38, which spring is coiled around and rockably mounted on bolt 39. The other end of spring 38 is adapted to be engaged by contact bar 40 when it is desired to move the head upwardly and thereby keep the nose in spring pressed engagement with rack 12. In the nose of dog 36 is a pin 41 that is engaged by one end of spring 42, which spring is coiled around and rockably mounted on bolt 43. The other end of spring 42 is adapted to be engaged by contact bar 40 when it is desired to move the head upwardly and thereby keep the nose in spring pressed engagement with rack 12. A pump, not shown, pumps hot asphaltum into hopper 30.

With the parts positioned for use as shown in Figs. 1 and 2 and it is desired to move the plant to another place, the following parts are disconnected and placed upon a separate conveying vehicle; the elevating mechanism; the weighing mechanism; the bottom portion of the bins; the diagonal braces 45 that run between posts 10; and the asphaltum hopper. Contact bar 42 is released from engagement with springs 38 and 42. The upper frame is unbolted from posts 10. Tie rods 44 are then placed to connect the upper and lower frames. The lower and platform frames are unbolted from posts 10. Lever 33 is then operated to lower the frames until the lower frame and its connected trucks engage and are supported upon and by the ground. The tie rods are then removed and lever 33 is again operated to lower the upper frame until it rests upon the platform frame to which it is then secured. Posts 10 are then removed and placed upon the separate conveyance. Power is applied to the trucks and the plant is removed to its future place of use, where the frames are properly positioned. The corner posts are then positioned and bar 40 is brought into engagement with springs 38 and 42. Lever 33 is then operated to raise the frames a sufficient height to permit conveyances in which the paving material is to be transported to the street or road to pass under the lower frame. The lower and platform frames are then secured to posts 10. The upper frame is then unbolted from the platform frame and lever 33 is then operated to raise the upper frame to its proper position, where it is bolted to posts 10. The other parts of the plant are then secured in their working positions and the plant is ready for use again.

It will be observed that when bar 40 is in engagement with springs 38 and 42 the operation of lever 33 will cause the upper frame to move upward on posts 10 until it reaches the top thereof and that when bar 40 is disengaged from said springs the operation of lever 33 will cause the upper frame to move down on posts 10. Posts 10 form the ground member of the jack. While I prefer to make the jack a part of the plant as described it is obvious that independent jacks could be used to raise and lower the frames but it would take more time to position and operate such independent jacks than it does to operate the jacks that are a part of the plant as described. When independent jacks are used any suitable form of corner posts may be used providing they are removably connected to the frames.

Having described my invention, I claim:

1. In a portable paving plant, corner posts having rack bars secured thereto; frames removably secured to said posts and slidably mounted thereon, said posts being removable from said frames when the frames are lowered to a transportable position; and means to raise and lower said frames upon said posts.

2. In a portable paving plant having detachable corner posts forming a part of a lifting jack construction; jack heads slidably mounted on said posts, said posts being detachable from the heads when the plant is in a transportable condition; said head having levers and dogs and being the other part of the jack construction, a top frame and a bottom frame, said top frame being connected to said jack heads, said frames being adapted to have secured thereto other members of a paving plant.

3. In a portable paving plant, frames adapted to have secured thereto means for mixing paving material; corner posts forming a part of lifting jacks on which said frames are mounted, whereby said frames may be raised and lowered, said jacks forming supporting means when positioned for use, said corner posts being removed from the other portions of said jacks when the plant is to be moved from place to place.

4. In a portable paving plant the combination of frames adapted to have secured thereto means for mixing paving material; and removable corner posts for supporting said frames when the plant is being used, said frames being detachably connected to said posts and slidable thereon, said posts being detached when the plant is in transportable condition.

In witness that I claim the foregoing I have hereunto subscribed my name this 27th day of June 1924.

MARTIN MADSEN.